(12) United States Patent
Narwal (10) Patent No.: US 9,753,480 B2
(45) Date of Patent: Sep. 5, 2017

(54) VOLTAGE REGULATORS

(71) Applicant: STMicroelectronics International N.V., Amsterdam (NL)

(72) Inventor: Rajesh Narwal, Greater Noida (IN)

(73) Assignee: STMicroelectronics international N.V., Amsterdam (NL)

( * ) Notice: Subject to any disclaimer, the term of this patent is extended or adjusted under 35 U.S.C. 154(b) by 204 days.

(21) Appl. No.: 13/962,958

(22) Filed: Aug. 9, 2013

(65) Prior Publication Data

US 2015/0042301 A1 Feb. 12, 2015

(51) Int. Cl.
*G05F 1/46* (2006.01)
*G05F 3/08* (2006.01)
*G05F 1/565* (2006.01)
*H02M 1/00* (2006.01)

(52) U.S. Cl.
CPC ............ *G05F 3/08* (2013.01); *G05F 1/46* (2013.01); *G05F 1/565* (2013.01); *H02M 2001/0025* (2013.01)

(58) Field of Classification Search
CPC ......... H02M 2001/0025; H02M 3/158; H02M 3/1588; H02M 3/1582; H02M 2001/0045; H02M 2001/0067; G05F 1/468; G05F 1/56; G05F 1/575; G05F 1/465; G05F 1/462; G05F 1/562; G05F 1/565; G05F 1/567; G05F 1/569; G05F 1/571; G05F 1/573; G05F 1/5735

USPC .......................................... 323/271, 273–280
See application file for complete search history.

(56) References Cited

U.S. PATENT DOCUMENTS

| | | | | |
|---|---|---|---|---|
| 3,887,822 | A * | 6/1975 | Suzuki | H03K 3/356104 326/97 |
| 4,940,930 | A * | 7/1990 | Detweiler | G05F 1/468 323/273 |
| 6,965,218 | B2 * | 11/2005 | Scoones | G05F 1/56 323/274 |
| 7,420,407 | B2 * | 9/2008 | Kim | G11C 5/14 327/525 |
| 2007/0070721 | A1 * | 3/2007 | Kim | G11C 5/14 365/189.09 |
| 2009/0322303 | A1 * | 12/2009 | Hirata et al. | 323/284 |
| 2010/0013447 | A1 * | 1/2010 | Furuse et al. | 323/234 |
| 2010/0237844 | A1 * | 9/2010 | Yeh | 323/284 |
| 2011/0018509 | A1 * | 1/2011 | Tseng et al. | 323/280 |
| 2011/0291630 | A1 * | 12/2011 | Konstadinidis | H02M 3/157 323/283 |

* cited by examiner

*Primary Examiner* — Harry Behm
*Assistant Examiner* — Bryan R Perez
(74) *Attorney, Agent, or Firm* — Seed IP Law Group LLP (57) ABSTRACT

An embodiment of an arrangement includes a voltage regulator configured to provide an output voltage, said voltage regulator configured to receive one of a plurality of different regulator reference voltages and a controller configured to provide a selection signal, said selection signal being used to control which of said regulator reference voltages said voltage regulator receives.

11 Claims, 5 Drawing Sheets

VOLTAGE REGULATORS

TECHNICAL FIELD

An embodiment relates to voltage regulators.

SUMMARY

Integrated circuits may have different circuit parts which require a known voltage or current to run as required. In order to provide this known voltage or current, a voltage regulator or current regulator is provided, respectively.

According to an embodiment, an arrangement includes: a voltage regulator configured to provide an output voltage, said voltage regulator configured to receive one of a plurality of different regulator reference voltages; and a controller configured to provide a selection signal, said selection signal being used to control which of said regulator reference voltages said voltage regulator receives.

According to an embodiment, the controller may include comparison circuitry, wherein said comparison circuitry is configured to compare said output voltage with at least one controller reference voltage to provide a comparison output.

According to an embodiment, the controller may include a comparator configured to compare said output voltage with at least one controller reference voltage.

According to an embodiment, the at least one controller reference voltage may have a value which is less than said output voltage.

According to an embodiment, the controller reference voltage may have a value which is within approximately 10 millivolts (mV) of the output voltage.

According to an embodiment, the comparison circuitry may be configured to compare a plurality of different controller reference voltages to said output voltage.

According to an embodiment, the controller may include selection circuitry configured to receive said comparison output and in response, to select one of said regulator reference voltages.

According to an embodiment, in dependence on said comparison output, a next higher or next lower reference may be selected.

According to an embodiment, the selection circuitry may include a counter.

According to an embodiment, the counter may be configured to select a higher reference voltage when a count increases or decreases and to select a lower reference voltage when the count decreases or increases, respectively.

According to an embodiment, the voltage regulator may include a differential amplifier configured to receive said selected reference voltage and said output voltage, said differential amplifier configured to provide an output which is used to control the output voltage.

According to an embodiment, an integrated circuit may include any of the previous arrangements.

According to an embodiment, a method includes: providing an output voltage from a voltage regulator using one of a plurality of different regulator reference voltages; and providing a selection signal which is used to control which of said regulator reference voltages said voltage regulator receives.

According to an embodiment, the method may include comparing said output voltage with at least one controller reference voltage to provide a comparison output.

According to an embodiment, the method may include comparing said output voltage with one controller reference voltage.

According to an embodiment, the one controller reference voltage may have a value which is less than said output voltage.

According to an embodiment, the controller reference voltage may have a value which is within approximately 10 mV of the output voltage.

According to an embodiment, the comparing may include comparing a plurality of different controller reference voltages to said output voltage.

According to an embodiment, the method may include providing said comparison output to regulator-reference-voltage-selection circuitry.

According to an embodiment, the selection circuitry may include a counter and said method may include selecting a higher reference voltage when a count increases or decreases and selecting a lower reference voltage when the count decreases or increases, respectively.

According to an embodiment, the method may include selecting in dependence on said comparison output, a next higher or next lower reference.

According to an embodiment, the method may include differentially amplifying said selected regulator reference voltage and said output voltage to provide an output which is used to control the output voltage.

According to an embodiment, an apparatus or arrangement may be provided to perform any of the above methods. The apparatus or arrangement may include a die or integrated circuit.

According to an embodiment, an integrated circuit includes: a voltage regulator configured to provide an output voltage, said voltage regulator configured to receive one of a plurality of different regulator reference voltages; and a controller configured to provide a selection signal, said selection signal being used to control which of said regulator reference voltages said voltage regulator receives.

According to an embodiment, the integrated circuit may include at least one capacitor provided on an output of said integrated circuit.

According to an embodiment, an arrangement includes: voltage regulation means for providing an output voltage, said voltage regulation means for receiving one of a plurality of different regulator reference voltages; and control means for providing a selection signal, said selection signal for controlling which of said regulator reference voltages said voltage regulation means receives.

In the above, many different embodiments have been described. It should be appreciated that further embodiments may be provided by the combination of any two or more of the embodiments described above, and that other non-described embodiments may exist.

BRIEF DESCRIPTION OF DRAWINGS

Embodiments are described below, by way of example only, with reference to the accompanying drawings, in which.

DETAILED DESCRIPTION

An embodiment will now be described with reference to FIG. 1. A voltage regulator 16 is provided. The voltage regulator 16 is, in some embodiments, provided on an integrated circuit 2. As will be described in more detail, most of the voltage regulator is provided on the integrated circuit 2, but a compensation capacitor 22 can be provided external to the integrated circuit.

This capacitor 22 is used to assist the stability of the regulator. The capacitor 22 is provided on a low-voltage device pin. In the embodiment shown in FIG. 1, one capacitor 22, and hence one pin, are shown. In some embodiments, more than one low-voltage device pin may be provided. Some or each of the low-voltage device pins may be provided with a capacitor.

Some embodiments aim to reduce the value of the one or more external capacitors as compared to current proposals. Current proposals use capacitors with a capacitance in range of approximately 1 uF to 4.7 uF. Some embodiments may be used with a device-pin capacitor in the range of approximately 1 uF to 40 uF. It should be appreciated that lower-value capacitors may be less expensive than higher-value capacitors.

If the value of a stability capacitor 22 is reduced, then the gain of an on-chip regulator may be limited. If the gain is lower, then the offset voltage may have a higher value. Offset voltage is defined as the change in the output voltage Vout when the current Icore in the core changes from a minimum value to a maximum value. With smaller chip feature sizes, the supply-voltage range may be limited at the higher side by the thickness of the oxide (e.g., the gate oxide of a transistor). On the other hand, the supply-voltage range may be limited on the lower side by the threshold voltage of a transistor. With smaller-feature-sized integrated circuits, the current consumption may be increased due to an increased leakage current or increased processing in the core of the integrated circuit.

In some embodiments, the dc (steady state) offset may be at least partially removed. This may ensure that the voltage remains within the supply-voltage range. This may alternatively or additionally provide a margin for accommodating the current transients.

Figure 1:
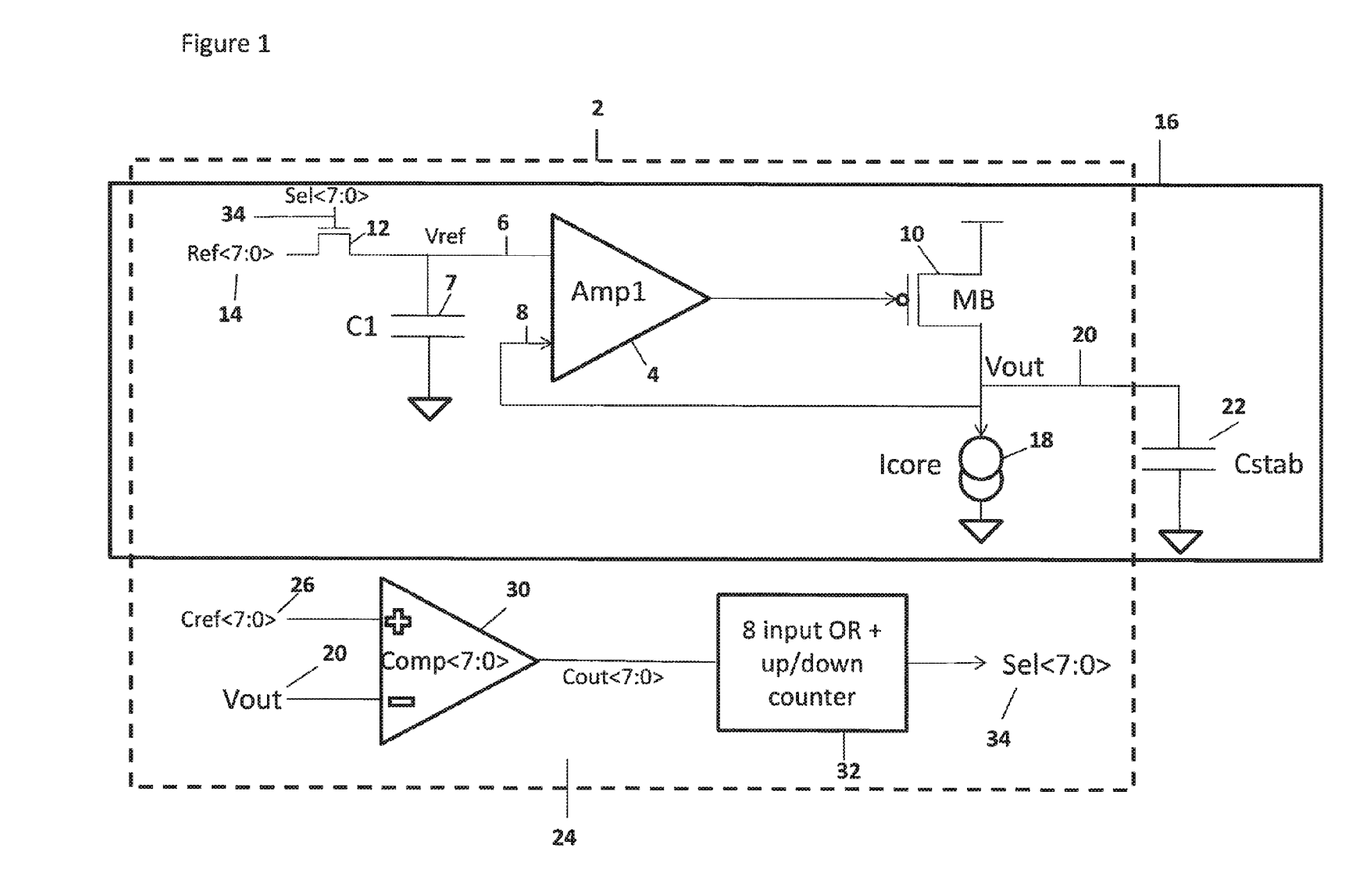
FIG. 1 shows a first voltage regulator arrangement on an integrated circuit, according to an embodiment.

In some embodiments, the arrangement shown in FIG. 1 may cancel the DC offset by increasing the reference voltage provided to the regulator by the offset amount.

In some embodiments, at higher temperatures there may be a constant leakage current inside the device which generates an offset. This leakage current is not switching. The arrangement of FIG. 1 may cancel the DC offset due to the leakage current.

The regulator 16 includes an amplifier 4. In some embodiments, this amplifier may be a differential amplifier. The amplifier 4 receives at a first input the output voltage Vout 20. Vout is provided as a feedback to the input of the amplifier. The amplifier 4 also receives as a second input a reference voltage Vref 6.

A capacitance C1 7 is provided between the Vref input of the amplifier 4 and ground. The value of Vref 6 is controlled by a transistor array 12. The transistor array 12 is shown in more detail in FIG. 2.

Figure 2:
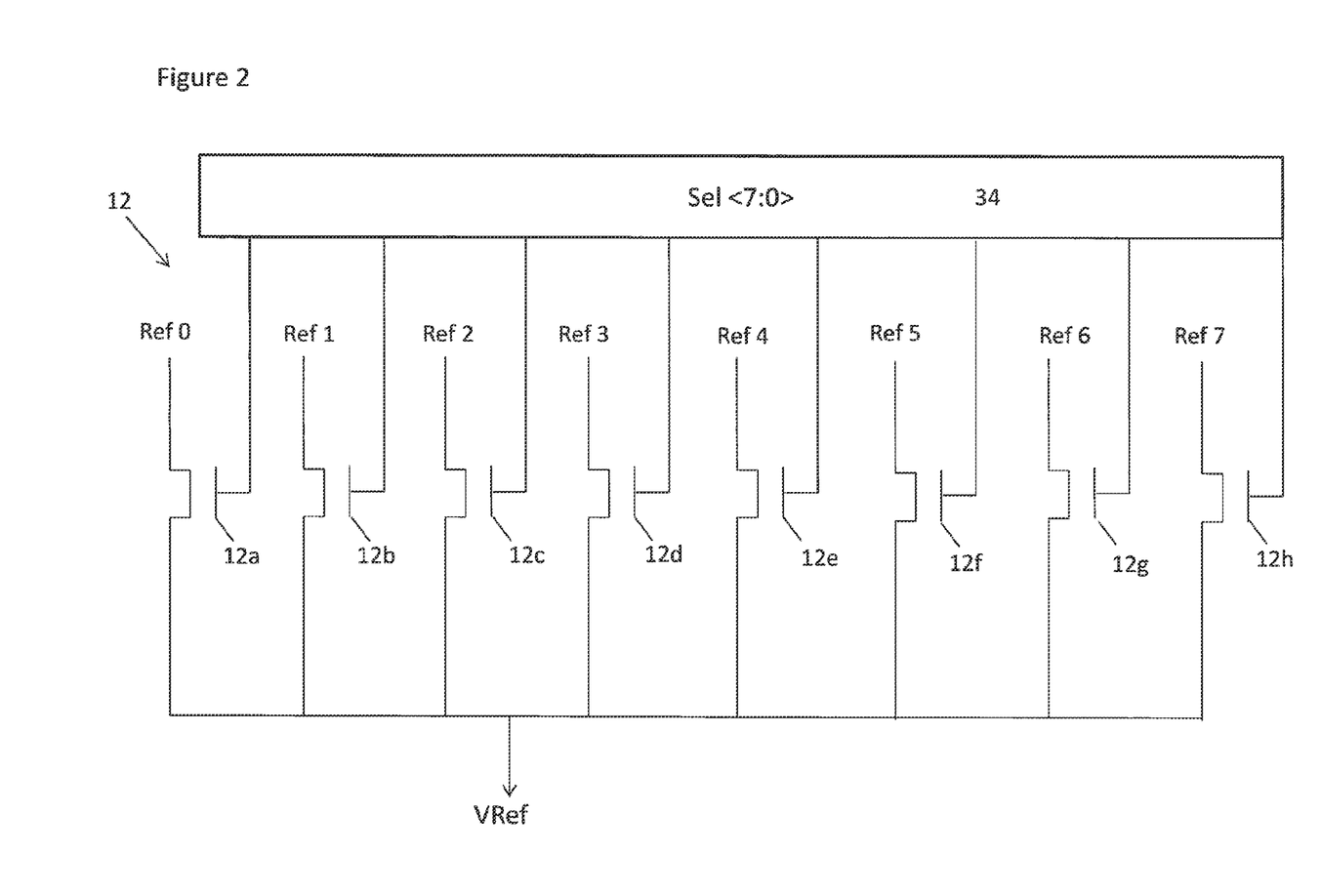
FIG. 2 shows part of the voltage selection arrangement of FIG. 1, according to an embodiment.

Reference is made to FIG. 2, which shows the transistor array 12 in more detail. The transistor array 12 includes N transistors. In this embodiment, N is equal to 8. It should be appreciated that in different embodiments, N can be greater or less than 8.

N different reference voltages are provided. As N is 8, in this example the reference voltages are Ref0 to Ref7. Each reference voltage is respectively coupled to one end (e.g., a source or a drain) of a channel of a transistor. The transistors are referenced 12a to 12h and are respectively coupled to one of the different reference voltages. Thus, reference voltage Ref0 is coupled to one end of the channel of the first transistor 12a and so on. Each gate of each transistor 12 is arranged to receive one bit of a seven-bit selection signal 24. This selection signal includes one bit at one state and N−1 bits at the other state. In this example, as the transistors are NMOS FET transistors, the one bit will be at the on state "1" and the other bits will be in the off state "0". Accordingly, all of the N transistors will be off except for one. Accordingly, the reference voltage supplied to the transistor which is turned on will provide the reference voltage Vref. In other words, the other end of the channel of the transistor to which the reference voltage is coupled will provide the reference Vref if the respective transistor is turned on.

In the example shown in FIG. 2, the transistors are NMOS transistors. However it is appreciated that this is by way of example only, and in different embodiments different transistors may be used. For example the transistors may be P-type transistors. Alternatively or additionally, the transistors may be based on an alternative technology to MOSFETs, for example bipolar technology or the like.

The N different voltages may be different from a next higher or next lower voltage by a discrete voltage step which is constant. For example, the lowest reference voltage value may be x, the next lowest voltage value may be x+y, the next voltage value may be x+2y and so on. However, this is by way of example only, and the difference between adjacent reference voltages may vary.

In an embodiment, the step size may be approximately 10 mV. However, the number of reference voltages or the step size may be dependent on the application.

In an embodiment, the lowest reference voltage may be approximately 1.20 V (Ref 0) and the highest reference voltage may be approximately 1.27 V (Ref 7). However, this is by way of example only.

The mechanism for controlling the value of the selection signal will be described in more detail later.

Referring again to FIG. 1, the amplifier 4 provides an output which is used to control the gate of a MOS ballast transistor MB 10. The transistor 10 is coupled at one end of its channel to a voltage rail and at the other end provides the output voltage Vout 20. The output voltage is, as mentioned previously, fed back into an input of the amplifier 4. The driving of the PMOS ballast transistor 10 generates power for the integrated circuit 2 and this is represented schematically by the current generator providing a current Icore 18 for the core. The output voltage Vout is output from the integrated circuit 2 and is coupled to the external stability capacitor Cstab 22 discussed previously.

The differential amplifier is configured to bring the output voltage Vout as close as possible to the reference voltage Vref. For this reason Vout is fed back to the input of the differential amplifier. The differential amplifier provides an output which controls the ballast transistor to act as a resistor, the value of the resistance being dependent on the output of the amplifier. The feedback of Vout is such that the transistor is controlled to have a resistance such that Vout tends to the value of Vref. This part of the circuit provides a relatively fine control of the value of Vout.

Figure 3:
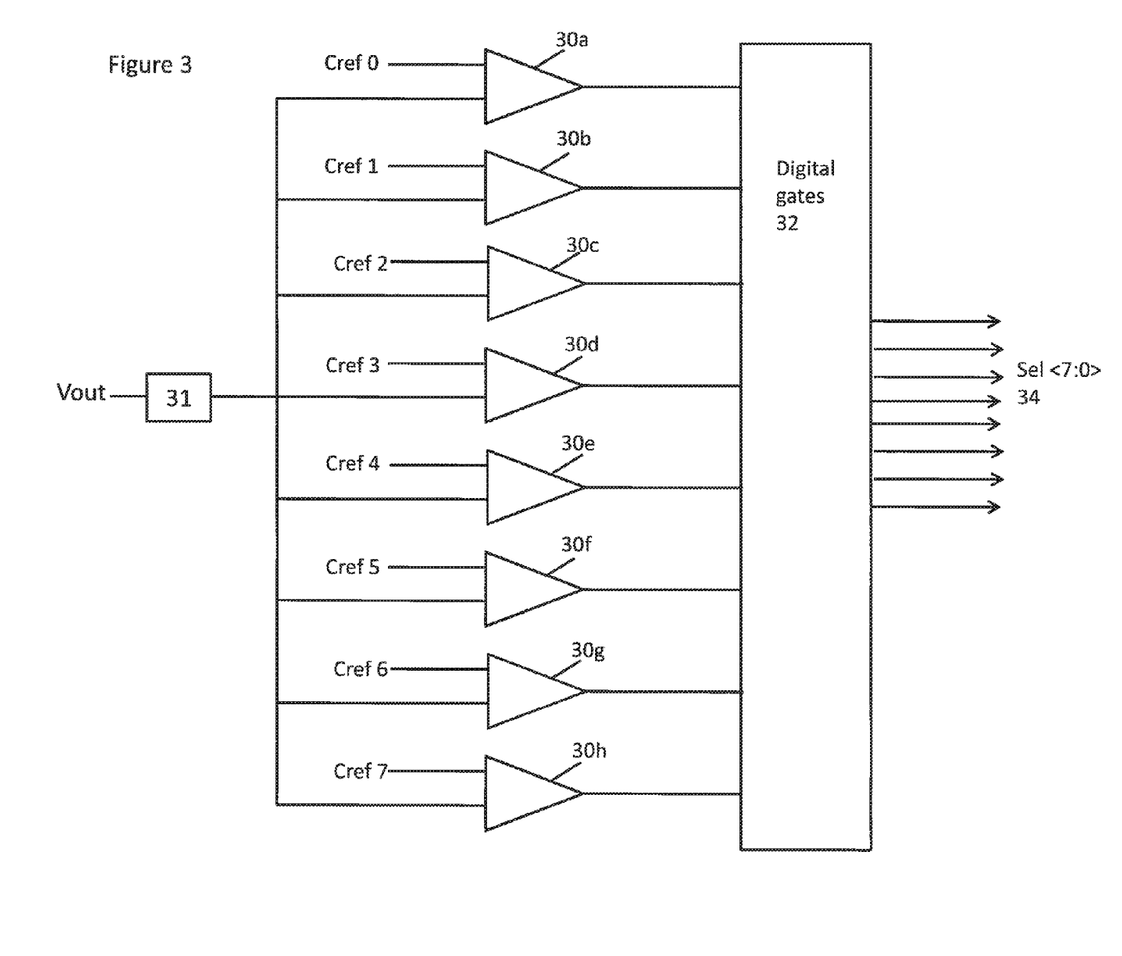
FIG. 3 shows part of the control part of the arrangement of FIG. 1, according to an embodiment.

The arrangement of FIG. 1 has a control part 24, which is configured to provide the selection signal discussed previously. In the embodiment shown in FIG. 1, the control part has N comparators 30. However, to simplify FIG. 1, only one of the comparators 30 is shown. Reference is made to FIG. 3, which shows in more detail the control part.

In FIG. 3, eight comparators 30a-30h are provided as N=8. Each comparator 30 receives one of eight comparator reference voltages Cref0 to Cref7. Vout is input to a low-pass filter 31. The low-pass filter is configured to filter out any transients on Vout. The output of the low-pass filter is provided as respective inputs to each of the comparators. These may have the same values as Vref. Thus, Cref0 may be approximately 1.19V and Cref7 may be approximately 1.12V.

A respective comparator will output a first value if the Vout is greater than Cref and a second value if Vout is less than or equal to Cref. Based on the outputs of the comparators, the digital block 32 provides a selection signal with a single active bit representing the reference voltage to be selected. If comparator number y provides a first value and comparator y+1 provides a second value, it can be determined that Vout is between the reference voltages used by comparators y and y+1. Accordingly, the digital gates 32 will be able to provide the selection signal with desired value. The digital block 32 may include an OR gate and an up/down counter.

Consider the following example of the operation of the circuit.

Assuming Vout=1.2V when the device is not demanding any current, and since Cref0=1.19V and Cref7=1.12V, all comparators provide an output equal to 0. The outputs of the comparators are provided to an OR gate, and the output of this OR gate is provided to an up/down counter. The counter counts down when the output is 0 and counts up when the output is 1. In some embodiments the counter may be designed with overflow protection.

In this example Ref0=1.2V and Ref7=1.27V. When there is no current Icore sourced by the ballast transistor MB, the output of OR gate is 0 and Ref0 is selected. Assume the device starts consuming current, and Vout falls by 10 mV to 1.19V. In this situation, the first comparator 30a will provide an output which is equal to a logic one level. This will cause the output of OR gate to be logic level 1, which is also the select signal of the up/down counter. The counter thus starts counting up and selects Ref1=1.21V. This increases the value of Vout by 10 mV and the value of Vout becomes 1.20V. In this condition, the output of the first comparator 30a becomes 0 and the counter counts down. This will cause Ref0=1.2V to be used. This will cause Vout to be equal to 1.19V such that the first comparator 30a output will be 1 repeating the above cycle. Thus Vout oscillates between 1.19 & 1.20V. These two levels of Vout may be maintained irrespective of the amount of current provided by the regulator.

Consider another example. If Vout drops to 1.16V (an offset of 40 mV), in this case the select signal of the up/down counter will remain 1 until Ref3=1.24V is selected. When Ref 3 is selected, Vout again becomes 1.2V and the counter select signal trips to 0. Finally Vout oscillates between 1.19V & 1.20V with the selection of Ref 2 and Ref 3 respectively.

Thus, if the device demands current, then Vout will start to fall. As Vout falls, one or more comparator output will change its state, thus causing the reference voltage to be increased.

In some embodiments, the transient currents may be only a third of the total device consumption. If substantially all or most of the offset due to the DC consumption of the device is cancelled (at least partially or completely) by the increase in the reference voltage, the undershoot or overshoot in the voltage due to the transient currents may be kept under control.

Since the voltage is kept close to 1.2V, any current transient is unable to generate a device reset. For example, suppose the device is consuming 100 mA DC current, which generates a DC offset of 50 mV. With some embodiments, this 50 mV DC offset is not significant. If suddenly the device demands another 100 mA current, then there will be an undershoot. Assuming an undershoot of 0.8 mV/mA, if the voltage was 1.2V the voltage would become 1.2V−80 mV=1.12V, which is higher than 1.08V, which is the minimum allowed supply. In contrast, without the reference-select circuitry, the minimum voltage would be 1.2V−50 mV (DC offset)−80 mV=1.07V, which is lower than the absolute minimum voltage limit. Thus some embodiments may allow a higher undershoot to be tolerated due to offset compensation.

In some embodiments, the offset due to a leakage current may be cancelled by the automatic increase in the reference voltage at higher temperatures.

Figure 4:
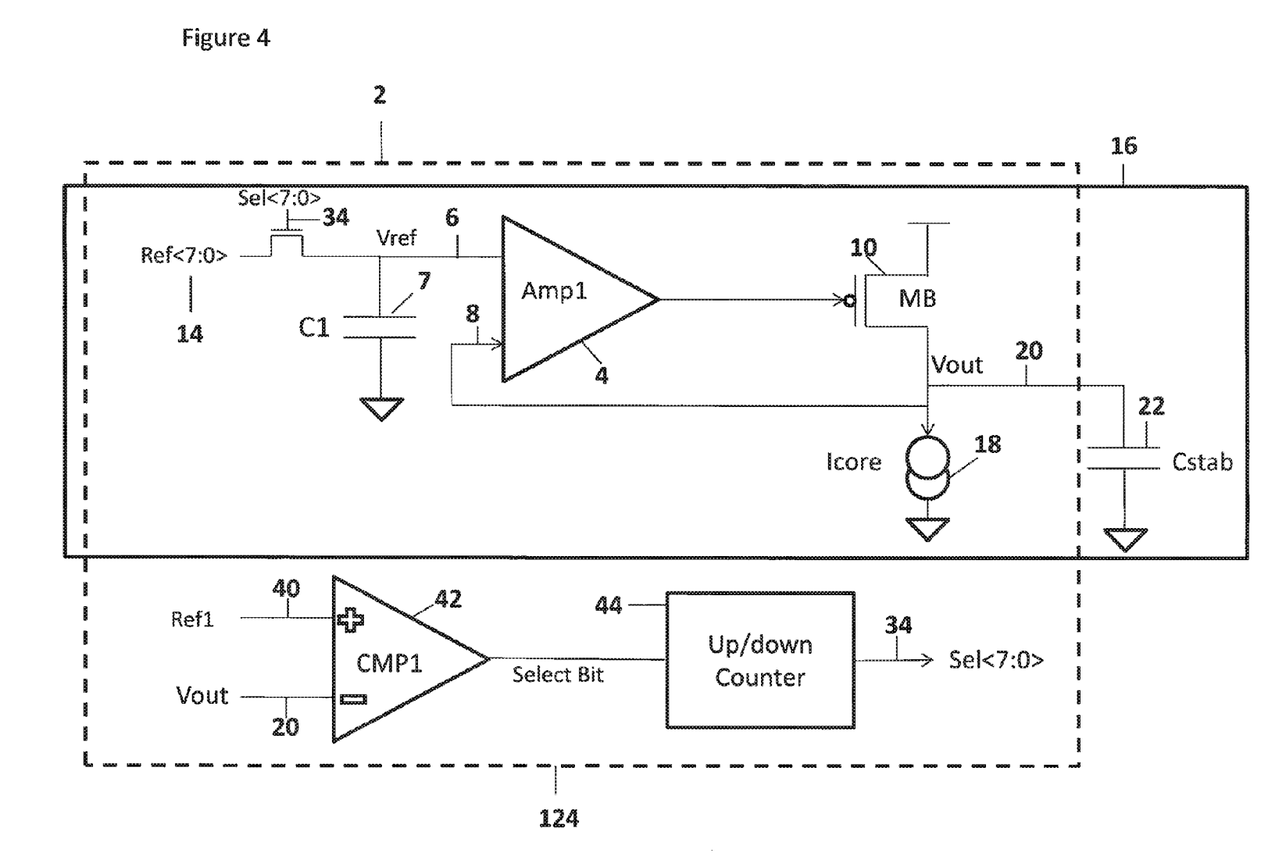
FIG. 4 shows a second voltage regulator arrangement on an integrated circuit, according to an embodiment.

Reference is made to FIG. 4, which shows an alternative arrangement to that shown in FIG. 1. It is appreciated that like elements are referenced using the same reference numbers. In the arrangement of FIG. 4, the voltage regulator 16 is as shown in FIG. 1. However, a modified control part 124 is provided.

The control part 124 of FIG. 4 includes a comparator 42, which has a first input REF1 40 and a second input Vout 20. The output of the comparator is provided to the up/down counter 44, which provides the select signal 34, which is used in the voltage regulator as described previously.

The comparator 42 compares the output voltage Vout with the reference voltage REF1. The output of the comparator is provided to the up/down counter. Depending on the result of the comparison, one of the taps of the selection signal is selected, which determines the reference voltage Vref going to the regulator. If the device demands more current, then the Vout starts falling. As Vout falls below Ref1, the comparator outputs a select bit zero. This means that the up/down counter has to count up and a next higher reference tap needs to be selected. The counter will keep on counting up until the selected bit becomes one. At this point, the counter starts counting down. When the counter oscillates between two states, this can be considered to be the stable state of the regulator. The reference voltage to the comparator is fixed and should be within about 10 mv of the final value Vout which is to be regulated. If Vout is to be kept to 1.2V, then Ref1 may be fixed at 1.19V.

In the embodiments of for example FIGS. 1 and 4, there are two closed loops. The first loop is that provided by the differential amplifier of the regulator with the feedback of Vout back into the input of the differential amplifier. There is a second closed loop which is used for the selection of the regulator reference voltage. These two loops are working at the same time. Accordingly, in an embodiment, the regulator reference (Vref) loop switches slowly as compared to the first loop with the differential amplifier. This provides system stability.

Figure 5:
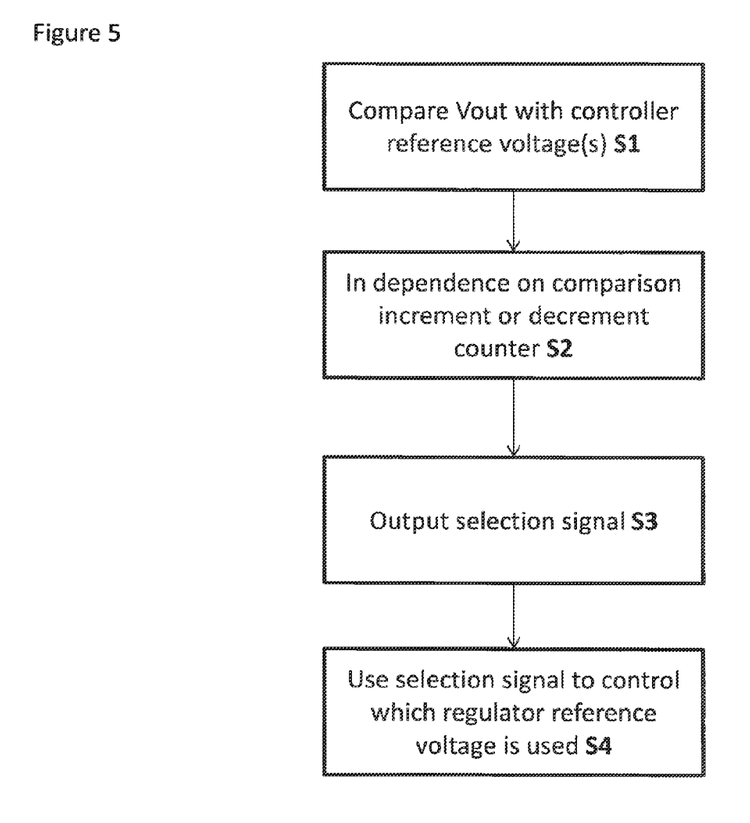
FIG. 5 shows a method according to an embodiment.

Reference is made to FIG. 5, which shows a method according to an embodiment.

In a first step, S1, the output voltage Vout is compared with the controller reference voltage or controller reference voltages. For example, in the arrangement of FIG. 3, Vout is compared with all of the controller reference voltages Crefn. In the case of the embodiment of FIG. 4, Vout is compared with the single reference voltage Ref1.

In step S2, in dependence on the comparison, a counter is incremented or decremented.

In step S3, a selection signal is output.

In step S4, the selection signal is used to control which regulator reference voltage is used by the voltage regulator.

Some embodiments have been described in relation to an integrated circuit. It is appreciated that some embodiments may be used with one or more dies which may be packaged together. For example, an embodiment of an integrated circuit that includes an embodiment of the above-described LDO may include a computing circuit such as a microprocessor or microcontroller. And this integrated circuit may be coupled to one or more other integrated circuits, such as a memory or pixel array. And these integrated circuits may be disposed on a same, or on respective, integrated-circuit dies.

Some embodiments compensate the offset due to DC current loads. This may provide advantages in terms of reducing the value, and thus the size, of the external stability capacitor 22. Consider the following example. Assume a regulator which has a DC offset of 35 mV with a device consumption of 100 mA. The output stability capacitor has a value of 2.2 uF. If the value of the output capacitor is to be reduced by a half to 1.1 uF, then the gain of the above-described first control loop (i.e., Vout, to the input of the amplifier 4, to the output of the amplifier, to the gate of the transistor 10, back to Vout) may need to be reduced by a half such that the system remains stable. The reduction in gain increases the DC offset voltage to 70 mV. With some embodiments, the scheme may increase the reference going to the regulator by 70 mV (by using the highest reference value) to compensate for the DC offset. In some embodiments, the 35 mV DC offset may be compensated and the output capacitor is 2.2 uF. Alternatively the output capacitor may be reduced by half (1.1 uF) and there is compensation for the 70 mV DC offset.

It is appreciated that the values given in the above embodiments are by way of example only and in different embodiments, different values may be used.

While this detailed description has set forth some embodiments, there may exist other embodiments which differ from the described embodiments according to various modifications and improvements.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A power supply, comprising:
   a regulator circuit configured to generate a regulated signal in response to a selected one of a plurality of first reference signals provided on a reference node of the regulator circuit;
   a reference circuit configured to simultaneously generate the plurality of first reference signals; and
   a controller configured to compare each of a plurality of second simultaneously generated reference signals to the regulated signal and, in response to these comparisons, the controller configured to provide the selected one of the plurality of first reference signals on the reference node of the regulator circuit, wherein the controller further includes:
   a plurality of comparators, each comparator configured to compare the regulated signal to a corresponding one of the plurality of second reference signals and to generate a corresponding output signal responsive to the comparison; and
   a digital logic circuit coupled to receive the respective output signals from the plurality of comparators, the digital logic circuit further configured to generate a count value based on the values of the output signals and configured to provide a selected one of the plurality of first reference signals to the regulator circuit based upon the count value.

2. The power supply of claim 1 wherein:
   the regulated signal includes a regulated voltage; and
   the first and second reference signals are reference voltages.

3. The power supply of claim 2 wherein the regulator circuit includes a low-dropout-regulator circuit.

4. The power supply of claim 1, wherein the digital logic circuit further comprises:
   an OR gate having a plurality of inputs, each input coupled to the output of a respective one of the comparators and the OR gate having an output; and
   a counter coupled to the output of the OR gate and configured to generate a count value in response to a value of a logic signal at the output of the OR gate, the controller providing the selected one of the plurality of first reference signals to the regulator circuit responsive to the count value.

5. The power supply of claim 1, further comprising:
   wherein the regulator circuit includes a node configured to carry the regulated signal; and
   a compensation capacitor coupled to the node.

6. A system, comprising:
   a first integrated circuit including:
   a reference voltage circuit configured to concurrently generate a plurality of first reference voltage signals; and
   a voltage regulator circuit configured to generate a regulated voltage signal in response to a selected one of the plurality of first reference voltage signals provided on a reference node of the regulator circuit; and
   a controller coupled to the voltage regulator circuit and the reference voltage circuit, the controller configured to compare each of a plurality of concurrently generated second reference voltage signals to the regulated voltage signal and, in response to these comparisons, the controller configured to provide one of the plurality of first reference voltage signals as the selected reference voltage signal on the reference node of the regulator circuit, wherein the controller further includes,
   a plurality of comparators, each comparator configured to compare the regulated signal to a corresponding one of the plurality of second reference signals and to generate a corresponding output signal responsive to the comparison;
   an OR gate having a plurality of inputs, each input coupled to the output of a respective one of the comparators and the OR gate having an output; and
   a counter coupled to the output of the OR gate and configured to generate a count value in response to a value of a logic signal at the output of the OR gate, the controller providing the selected one of the plurality of first reference signals to the regulator circuit responsive to the count value; and a second integrated circuit coupled to the first integrated circuit.

7. The system of claim 6 wherein one of the first and second integrated circuits includes a computing circuit.

8. The system of claim 6 wherein the first and second integrated circuits are disposed on a same die.

9. The system of claim 6 wherein the first and second integrated circuits are disposed on respective dies.

10. The system of claim 6 wherein a portion of the regulator is disposed outside of the first integrated circuit.

11. A method for a voltage regulator, comprising: selecting a reference voltage signal; regulating a voltage signal in response to the selected reference voltage signal; generating at the same time a plurality of candidate reference voltage signals; generating at the same time a plurality of comparison reference voltage signals; comparing each of the comparison reference voltage signals to the regulated voltage signal; and providing on a reference node the selected reference voltage signal from among the plurality of candidate reference voltage signals responsive to the comparisons, wherein providing on the reference node the selected voltage signal includes: generating a comparison voltage signal responsive to the comparing of each of the comparison reference voltage signals to the regulated voltage signal; performing a logical OR operation on the generated comparison voltage signals to generate a logic output signal; adjusting a count value responsive to the logic output signal; and choosing the selected reference voltage signal responsive to adjusted count value.

* * * * *